Figure 1:
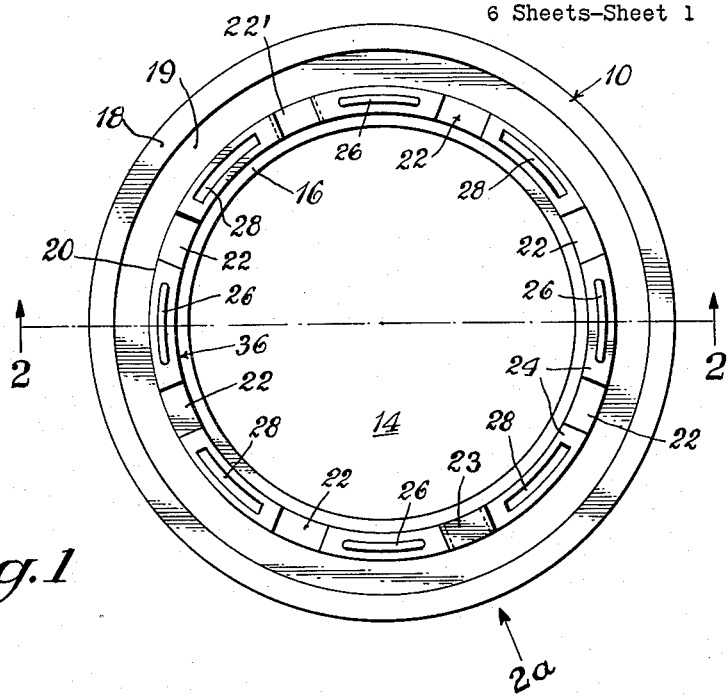

July 5, 1966          D. E. WIEGAND          3,259,248

FILTER UNIT, CARTRIDGE AND COUPLING MEANS

Filed Jan. 30, 1963          6 Sheets-Sheet 1

Inventor
Donald E. Wiegand by W. Bartlett Jones,
Attorney

Inventor
Donald E. Wiegand
by W. Bartlett Jones,
Attorney

July 5, 1966     D. E. WIEGAND     3,259,248

FILTER UNIT, CARTRIDGE AND COUPLING MEANS

Filed Jan. 30, 1963     6 Sheets-Sheet 3

Inventor
Donald E. Wiegand
by W. Bartlett Jones,
Attorney

July 5, 1966   D. E. WIEGAND   3,259,248
FILTER UNIT, CARTRIDGE AND COUPLING MEANS
Filed Jan. 30, 1963   6 Sheets-Sheet 4

Inventor
Donald E. Wiegand
by W. Bartlett Jones,
Attorney

July 5, 1966 D. E. WIEGAND 3,259,248
FILTER UNIT, CARTRIDGE AND COUPLING MEANS
Filed Jan. 30, 1963 6 Sheets-Sheet 5

Inventor
Donald E. Wiegand
by W. Bartlett Jones,
Attorney

Inventor
Donald E. Wiegand
by W. Bartlett Jones,
Attorney.

United States Patent Office 3,259,248
Patented July 5, 1966

3,259,248
FILTER UNIT, CARTRIDGE AND COUPLING
MEANS
Donald E. Wiegand, Minneapolis, Minn., assignor to
Wood Conversion Company, St. Paul, Minn., a corporation of Delaware
Filed Jan. 30, 1963, Ser. No. 254,870
25 Claims. (Cl. 210—487)

The present invention relates to filters for liquids, and in particular, to a disposable filter cartridge for use in self-service, pay-as-you-use dry-cleaning apparatus.

In such units, the cleaning fluid, commonly perchlorethylene, is reused numerous times, and before reuse, is passed through a mechanical filter which removes the dirt and debris accumulated in use. In commercial establishments having such apparatus available for use by the public, economies are important items. One development for economy is the provision of a filter cartridge, which is low in cost, easily inserted in place in a filter tank, of long life, and finally disposable.

In my copending application Serial No. 186,466, filed April 10, 1962, I have described a filter cartridge comprising a filter unit carried in a holder, as a disposable cartridge, to be used in a receiving tank wherein the cartridge and tank have cooperating parts. The filter unit therein described is a pile of individual filter elements secured together in such a way that the liquid filtered through and into each element leaves the element by passing through an adjacent element in a channel at the union between them.

The present invention relates to the structure of the elements, and in partciular, to the parts thereof where one element is joined to the next in the pile. As illustrated in said copending application, each filter element basically comprises two filter leaves secured together at their peripheries and unsecured inwardly of their peripheries. In the pile, adjacent leaves of adjacent filter elements have registering openings for passage of liquid. One way of securing adjacent filter elements together in a pile is to stitch adjacent leaves of adjacent filter elements together around their registering openings. Mechanical problems are involved.

It is not practical to form the individual elements with their two leaves peripherally secured, and then to stitch adjacent elements together around their registering openings. Rather, the leaves which are to be adjacent ones in the pile are first stitched together around their registering openings, and then the companion leaves for the filter elements are secured together at their peripheries, as by stitching. In doing this, the growing pile becomes unwieldy and difficult to handle conveniently.

The present invention provides for a union or coupling construction whereby each filter element may be completed, and then, the filter elements readily joined together in a pile.

It is the general object of the invention to provide a filter element of the type described with complementary parts enabling adjacent filter elements to be united.

It is also a particular object of the invention to provide a swiveling coupling union.

It is a particular object to provide complementary snap-action engaging means for uniting adjacent filter elements in forming a pile thereof.

Figure 2:
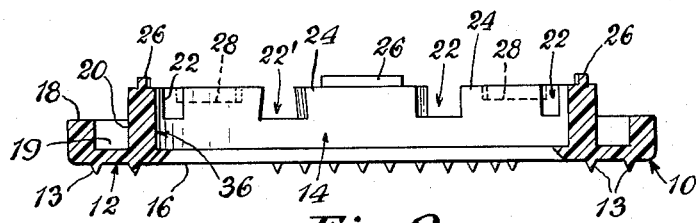
Figures 2A, 3:
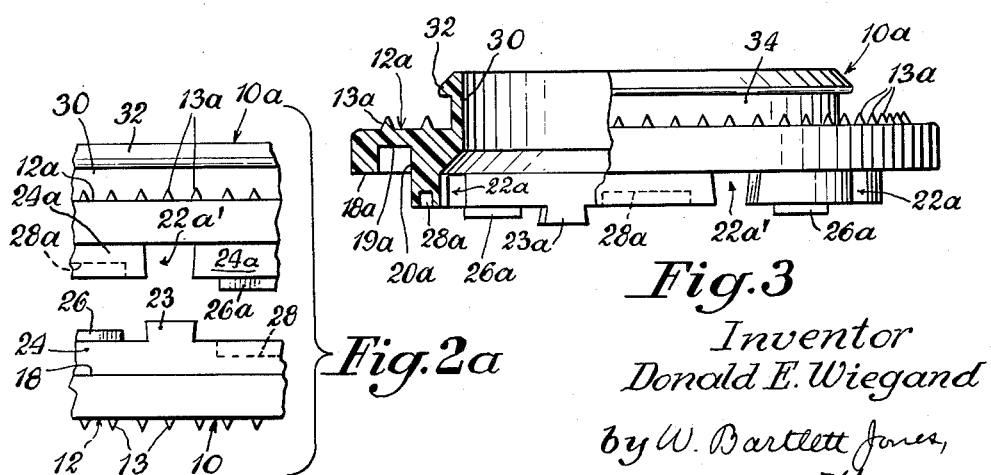
Figure 4:
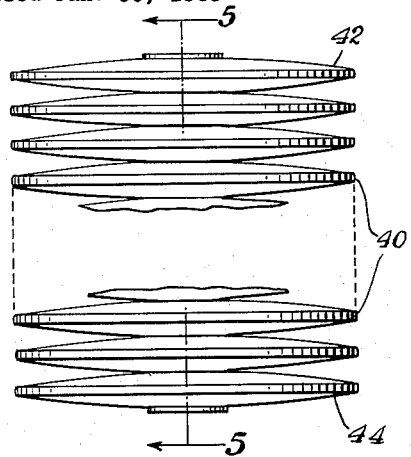
Figure 3A:
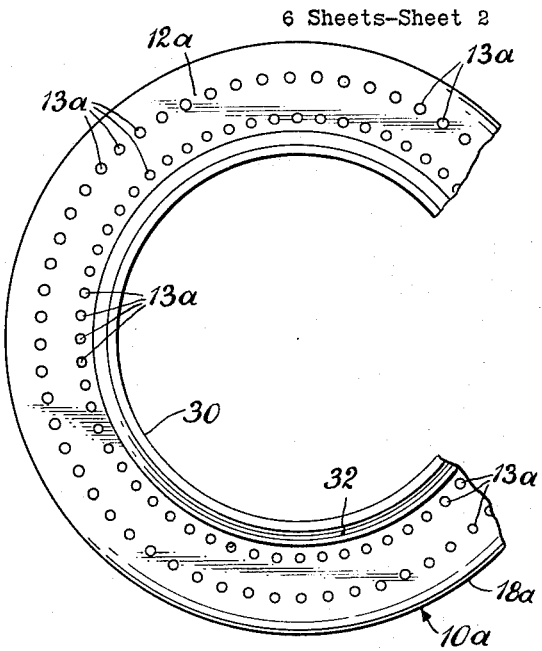
Figure 5:
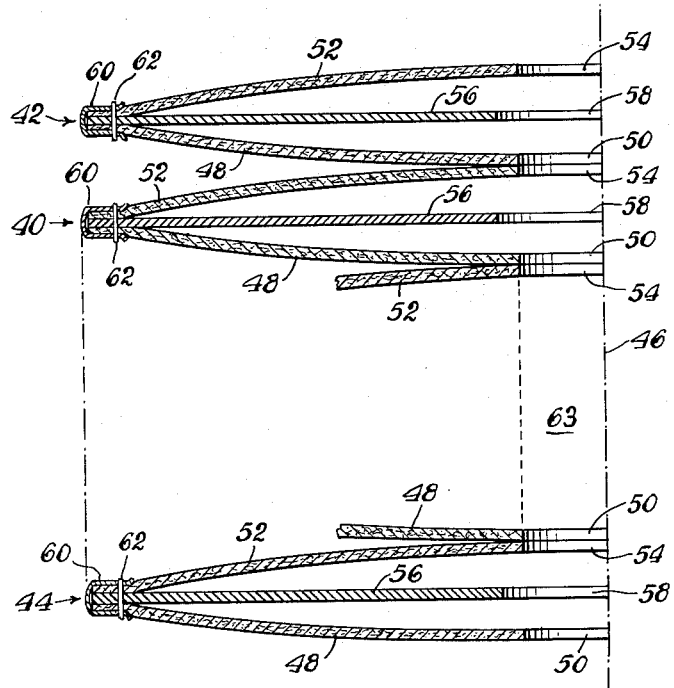
Figure 6:
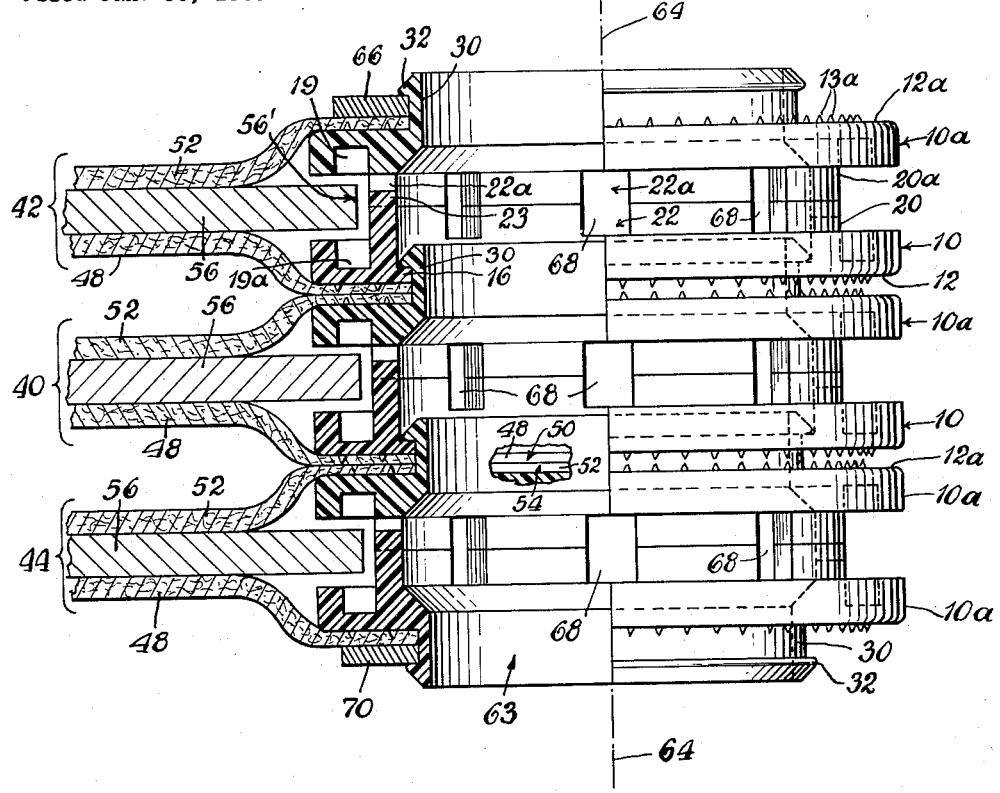
Figure 7:
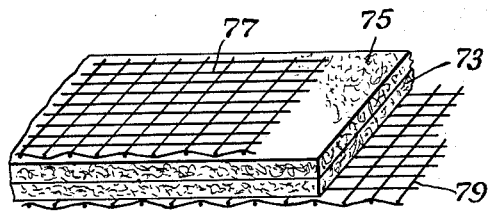
Figure 8:
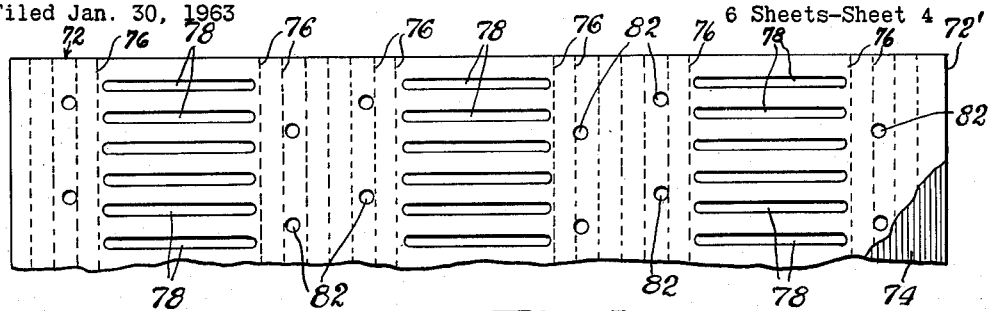
Figure 10:
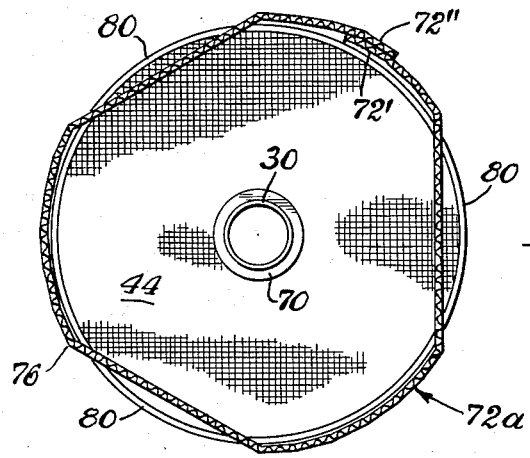
Figure 9:
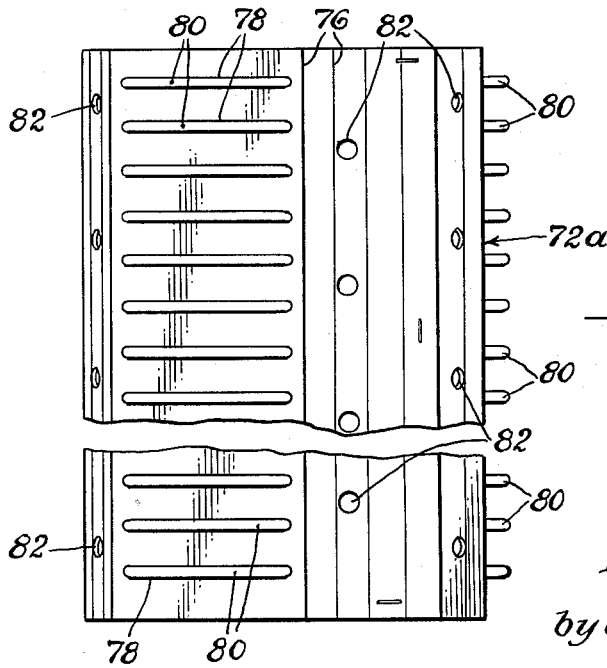
Figure 11:
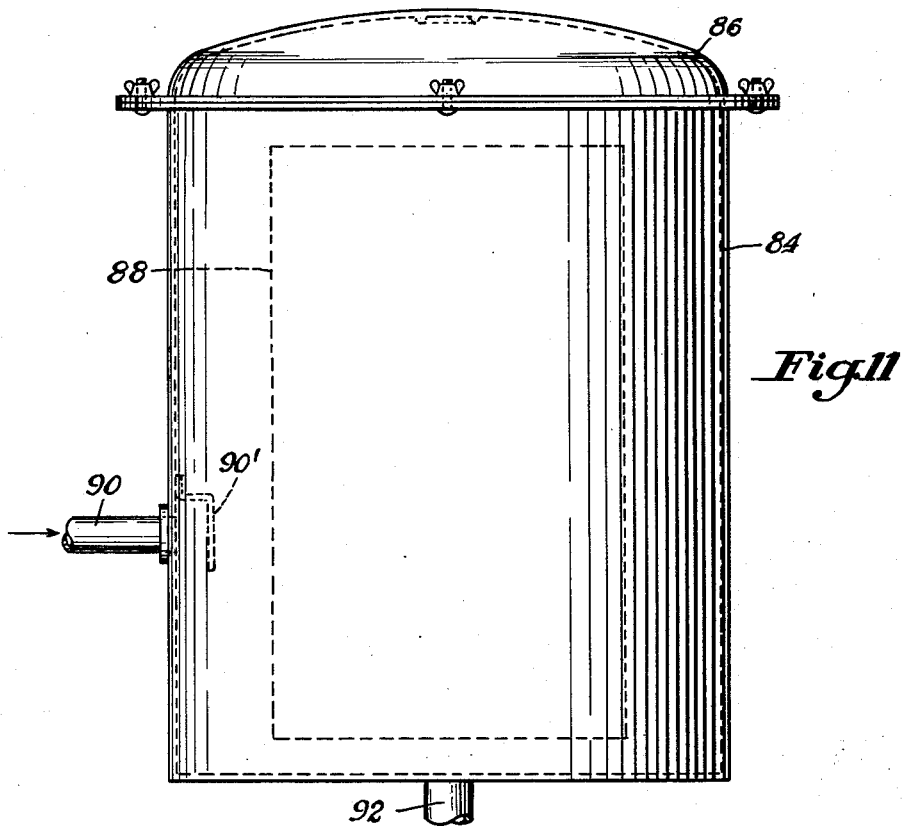
Figure 12:
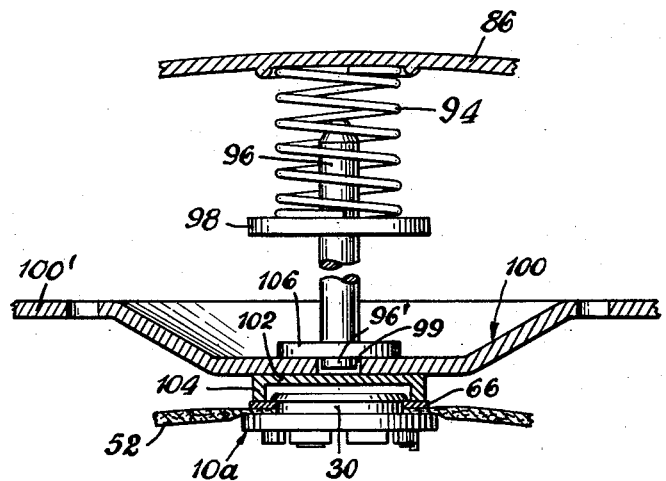
Figure 13:
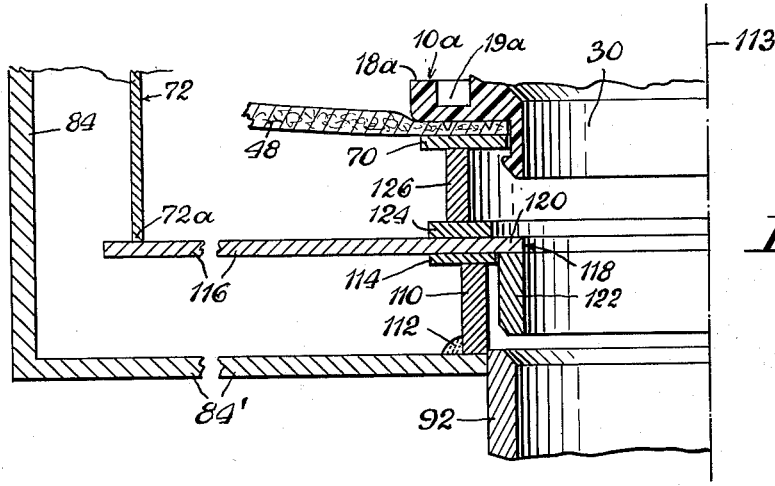
Figure 15:
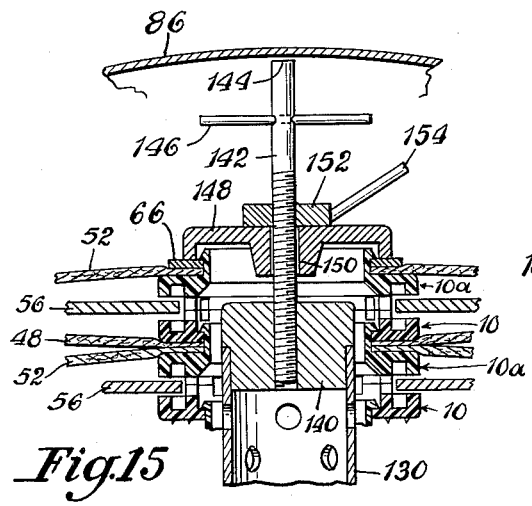
Figure 16:
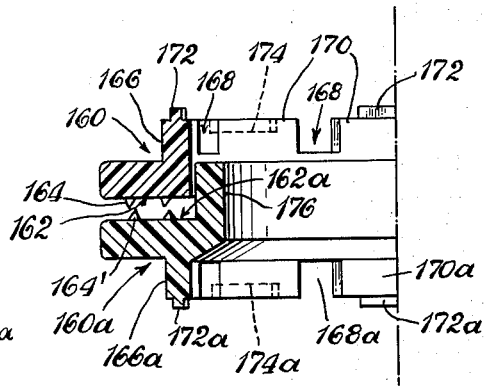
Figure 14:
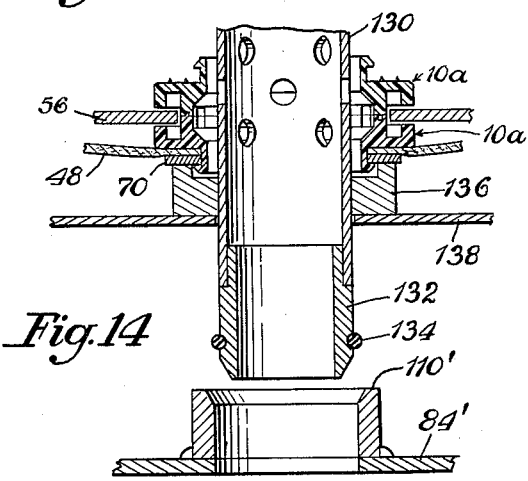

Various other and ancillary objects and advantages of the invention will become apparent from the following description and explanation of the invention as set forth in the accompanying drawings, in which:

FIG. 1 is a plan view of one section of a union.
FIG. 2 is a cross-section of the view of the structure shown in FIG. 1 on line 2—2 thereof.
FIG. 2a is a fragmentary view looking at FIG. 1 in the direction of arrow 2a, and showing the ring of FIG. 1 in position about to register with a companion section shown in FIG. 3.
FIG. 3 is a side view partly in cross-section of a companion section of the union.
FIG. 3a is a broken plan view of the form shown in FIG. 3 to show the locations of tiny pimples.
FIG. 4 represents the profile of a filter unit composed of a pile of circular filter elements.
FIG. 5 is an enlarged fragmentary cross-section of portions of the unit shown in FIG. 4 taken on the line 5—5 thereof, showing only one-half of the structure at one side of the axis, and illustrating a filter unit of two leaves with internal spacing means. In FIG. 5, the two sections of each union which normally belong in the unit are omitted for drafting convenience being better illustrated in FIG. 6.
FIG. 6 is a fragmentary detailed view partly in cross-section supplementing the structure of FIG. 5 and illustrating the positions of the sections of the union in a filter unit.
FIG. 7 is a perspective view showing the general structure of the material of the filter leaves.
FIG. 8 is a fragmentary view of a suitably rigid sheet of material used to form a holding case for the filter unit.
FIG. 9 is a view of a filter cartridge having the filter unit mounted in the holding case.
FIG. 10 is a plan view of the top of the filter cartridge of FIG. 9.
FIG. 11 is a view of a filter tank indicating the position of a filter cartridge therein.
FIG. 12 is an enlarged detailed cross-section of connections between the filter cartridge and the inside top of the tank shown in FIG. 11.
FIG. 13 is an enlarged detailed fragmentary cross-section of the connections between the filter cartridge and the exit conduit of the tank of FIG. 11.
FIG. 14 is a fragmentary view of the bottom of a filter cartridge fitted with an internal perforated stem for connection to the outlet of a tank.
FIG. 15 shows the top of the stem-fitted cartridge as it is sealed in place by the top of the tank.
FIG. 16 is a fragmentary view of modified forms of sections 10 and 10a assembled in position to couple two filter elements, omitting the channels 19 and 19a and omitting the lips 16 and 32 which participate in the snap-action coupling union.

Numerous mechanical two-part unions are available to connect one element to another, wthen adjacent elements carry complementary parts of the union. Some filter elements are circular and others are non-circular. For circular ones, wherein the union is central, there is no need for the union to permit swiveling. In such cases, the union parts may be secured to the leaves without regard to the ultimate positions of the adjacent elements. For other forms, such as square filter elements, a non-swiveling union must have its parts oriented with reference to the closed union so that the adjacent squares are alined. According to one feature of the present invention, a swiveling union is provided so that when used on non-circular filter elements, the two parts need not be oriented with reference to the shape of the filter element.

In a filter unit comprising a pile of united filter elements, the end elements may require different structures for a proper assembly in a tank of a filter cartridge containing such unit.

The union comprises two sections preferably and optionally united by a snap-action, resulting from the use of yieldable, yet substantially rigid plastic, in particular, polyethylene.

A feature of the union is the relation of its parts permitting use to form a pile of filter elements. The union is referred to as having a first section and a second section, each with a circular opening where swiveling action is desired. The shape of the sections is not critical, but for convenience in manufacture and use, each is preferably in the form of an annulus. The circular opening of the first section has a coaxial collar surrounding its opening which collar enters the circular opening of the second section preferably with a snap-action and preferably in such snap-fit with a controlled amount of axial looseness in the connection. In such united positions, the exposed faces of the two sections of the union are illustrated as identical and complementary for the particular use herein disclosed, so that any two such faces may be joined coaxially with a snug "pull-apart" fit. These features will be better understood from the description and explanation hereinafter given of the preferred forms and structures shown in the drawings.

In FIG. 1, the receiving or designated second section 10 of the union has its cross-section shown in FIG. 2. The section 10 is in the form of an annulus, having a flat face 12 to serve as one clamping member for adjacent leaves of adjacent filter elements. From said face 12 project two concentric rows of very small pointed pimples 13 for engaging the fabric to contact said face 12. The co-acting first section designated 10$^a$ in FIG. 3 has a face 12$^a$ to oppose face 12 and cooperate therewith to clamp the fabric between them. Face 12$^a$ likewise has small pointed pimples 13$^a$. For snap-action, central opening 14 has a thin inner lip 16 extending radially inward of the opening and preferably located at the flat face 12, and slightly bevelled as shown, which lip is a detent for a preferred snap-action fit with a complementary lip or ring on the companion first section 10$^a$ of the union shown in cross-section in FIG. 3. In FIG. 2 the toothed upper face of the section 10 shown in FIGS. 1 and 2 is duplicated in section 10$^a$ and the duplicating parts are complementary for the use of the union herein disclosed. Accordingly, only the said upper face, shown also in plan view in FIG. 1, is described in detail. The said toothed duplicating faces of sections 10 and 10$^a$ need not be identical so long as they are complementary and interfitting. The identity has a function in that any one section may be made to interfit with a section 10 or a section 10$^a$, as will be illustrated hereinafter.

Other details of the union are directed to use of the union for forming a filter unit, particularly for the purpose of forming passageways for liquid to enter a channel formed by the circular openings of a pile of the unions. An external rim or flange 18 of section 10 provides a space between it and a like flange 18$^a$ on section 10$^a$, when said complementary interfitting identical faces are tightly matched. The rims 18 and 18$^a$ each provide one wall of a circular channel 19 and 19$^a$, respectively, of which the opposite wall is a wider inner collar or flange 20 in section 10, and 20$^a$ in section 10$^a$. Said channels 19 and 19$^a$ are merely the result of conserving plastic material in molding the sections 10 and 10$^a$. Collar 20 has its outer edge provided with special structure at 45° positions around the circle. At these locations, there are six recesses designated 22 and modified seventh designated 22'. At the eighth position there is a projection or tooth 23 which flares outwardly to a slight extent, which is directly opposite recess 22'. The recess 22' tapers outwardly to a slight extent, so as to receive a correspondingly flaring tooth like 23 with a snap-fit which may be pulled apart. Since section 10$^a$ has a similar facial structure with recesses 22$^a$ and 22$^{a'}$ and a flaring tooth 23$^a$, the two sections may be snapped together. The recesses 22 and 22' and the teeth 23 and 23$^a$ thus locate a corresponding number of arcuate tooth-like projections designated 24 and 24$^a$, two of which are joined by lack of a recess at each said eighth position, and by the teeth 23 and 23$^a$ thereat. Alternate projections 24 have extending from within the area of their tops thin arcuate ribs 26, and the intermediate projections 24 have at corresponding locations sockets 28 to receive like ribs 26$^a$ of companion section 10$^a$. FIG. 2a shows in the uppermost position a fragment of a section 10$^a$ as positioned in FIG. 3, about to receive a fragment of a section 10 as positioned in FIG. 2, arcuate positions being chosen to present tooth 23 in position to snap into recess 22$^{a'}$. It also shows rib 26 about to enter socket 28$^a$ and rib 26$^a$ about to enter socket 28.

With the two sections joined at said identical toothed faces described, and with ribs like 26 of each section in sockets like 28 of an opposite section, six opposite recesses 22 and 22$^a$ are in register and provide passageways from the peripheral exterior to the circular openings of the assembled sections.

The companion sections 10 and 10$^a$ fit together complementarily, not only as described, but also at the opposite flat faces, so that flat face 12 of section 10 opposes a flat face 12$^a$ of section 10$^a$. Section 10$^a$ differs from section 10 in having an annular collar 30 extending away from the flat face 12$^a$, which collar enters the opening 14 in a section 10.

When the preferred snap-action entry of section 10$^a$ into section 10 is provided for, the said lip 16 of section 10 has its function. The collar 30 has a cylindrical section 34 snugly but freely sliding within the annular lip 16. It has external lip 32 at its outer edge, which lip 32 hooks over the lip 16 of section 10, the resilience of the plastic material permitting lip 32 to pass through the smaller opening formed by lip 16. The height of said collar portion 34 is sufficiently greater than the thickness of lip 16 to permit controlled relative axial movement with the lip 16 sliding on the collar portion 34 after the lips 16 and 32 are interlocked by the snap-action union which is permitted by the plastic employed. This controlled amount of movement permits the opposed fabric-clamping faces 12 and 12$^a$ to be movably spaced apart. As described hereinafter, the opposed faces 12 and 12$^a$ are used to pinch or compress together adjacent leaves of two adjacent filter elements. In so doing, the pointed pimples 13 and 13$^a$ engage the fabric.

When the sections 10 and 10$^a$ are constructed and united to permit snap-union and said relative axial movement, it is preferred to bound the opening 14 in the second section with a cylindrical wall 36 beyond the lip 16. When the diameter of the said wall 36 is substantially the same as the maximum diameter of the lip 32 on the collar 30, lip 32 slides on wall 36 when lip 16 slides on the collar portion 34 during relative axial movement of the two united sections 10 and 10$^a$. As shown, the wall 36 is the inner wall of the collar or flange 20.

The structures of sections 10 and 10$^a$ are not limited to those described. When the snap-union is not employed, the construction may be simplified as shown hereinafter in reference to the modified form of FIG. 16.

FIG. 4 shows the general structure of a filter unit. It is a pile of a plurality of filter elements of which the intermediate ones are designated 40 and the end ones 42 and 44, the illustrated ones being representative of any shape. FIG. 5 is an enlarged cross-section of FIG. 4 on line 5—5, showing one-half of a filter unit at one side of a center line 46, the unit being shown without the union sections which are necessary to complete it, as better illustrated in FIG. 6.

The illustrated component parts of the filter unit are shown schematically without designating the material or the structure of the components, which detail is elsewhere exemplified. The filter elements are designated as in FIG. 4, the filter elements shown being identical, namely, 40, 42 and 44. Each element has a first filter leaf 48 with an exit opening 50 at its center. Its second filter leaf 52 has an entrance opening 54 at its center. Between the two leaves 48 and 52 is rigidifying spacing means 56, such as cardboard, either loosely positioned or secured, which has a central circular opening 58 slightly larger than the openings 50 and 54. The spacer 56 extends at least close to the inner periphery of the space between the first and second leaves. The spacer also extends at least close to the outer periphery of the said space, and preferably beyond it. As shown, the spacer 56 is secured within the peripheral edges of the leaves, by use of edge-binding or tape 60 sewed at 62.

In FIG. 5, the adjacent leaves of adjacent filter elements are shown as having the peripheries of their registering openings in contact so as to seal the interior of each element from communication with the exterior of the element except through the elongated central channel 63 formed by the registering openings. The means for so holding the leaves in sealing contact is an assembly of first and second sections of the union above described, as illustrated in FIG. 6.

FIG. 6 is an assembly showing only three filter elements in fragmentary form, the parts being numbered as in the preceding figures. In practice, more than three filter elements are used in one pile, as indicated in FIG. 5 and elsewhere, but only three are shown for convenience in illustration, merely to exemplify various uses of the sections 10 and 10$^a$.

In FIG. 5, filter leaves 48 and 52 are shown spaced away from the reinforcing spacer 56, whereas in FIG. 6, they are shown in contact with the spacer 56. In use of the filter there is a differential pressure of liquid being filtered, which is higher on the exterior thus flattening the leaves onto the spacer.

In FIG. 6, the union sections are shown in diametrical cross-section to the left of center line 64, and in full to the right of center line 64, but the filter elements 40, 42 and 44 are shown only on one side of the center line 64, for clarity in illustration.

Element 42 at the top has a union section 10$^a$ with its snap-collar 30 extending through the opening 54 (see FIGS. 5 and 6) of annular filter leaf 52, whose peripheral edge at said opening 54 rests on flat face 12$^a$. The inner edge 56′ of the spacer 56 terminates opposite the ports formed by opposing recesses 22 and 22$^a$. An annular gasket 66 is shown around the collar 30 over leaf 52 which, in some installations, functions as a seal.

Below uppermost union section 10$^a$ in FIG. 6 is a first union section 10, both sections 10$^a$ and 10 having their identical complementary faces in matched relation. The flat face 12 of section 10 fits over the periphery of opening 50 in the filter leaf 48. Then, below said section 10 is a second union section 10$^a$ with its collar 30 snap-fitted into the circular opening 14 of said section 10, by the lip 32 on collar 30 having passed the ring or lip 16 of section 10.

As mentioned above, the space between flat faces 12 and 12$^a$ is variable. This space is used to compress together the leaf 48 of filter element 42 and the adjacent leaf 52 of adjacent element 40.

As many filter elements as desired may be assembled in a pile by alternating the uniting union sections 10$^a$ and 10, and pinching together adjacent leaves of adjacent elements with their spacers terminating over the opposing channels 19 and 19$^a$. As appears in FIG. 6, the space outside of collar 20 of section 10 and collar 20$^a$ of section 10$^a$ communicates with axial channel 63 through the port holes formed by opposing recesses in those collars and designated as 68 in FIG. 6.

The bottom end-element 44 has the same inner union section 10$^a$ in the same position as in the inner element 40 and the top end-element 42, but its outer union section differs, in that it is also a section 10$^a$, rather than a section 10. Thus, it provides a projecting ring or collar 30, to duplicate the collar 30 at the opposite end. A gasket 70 is shown around the collar 30 over the leaf 48, which can function in mechanically connecting the unit into a tank, and also function to compress the adjacent leaf 48 against section 10$^a$ in the absence of a contacting leaf. In a tank clamping pressure is exerted on the two gaskets 66 and 70, thus to hold the assembled parts together, and maintain the interior of the filter out of communication with the tank space exterior to the filter.

In FIG. 6, the upwardly directed collars 30 permit building upwardly by adding more units, and finishing always with a collar around which the gasket 66 may be used. In FIG. 6, the bottom filter element has been shown and described as the end-element, likewise having a projecting collar 30. By omitting the gasket 70 shown around said bottom collar, more filter elements may be added by building downwardly in the same manner as mentioned above for building upwardly. When this is done, the filter element which contains two first union sections 10$^a$, such as the filter element 44 in FIG. 6, may be located at either end of the pile or at any intermediate position.

The filter medium of the leaves of the filter elements may vary. In keeping with the objectives of economy and disposability, low-cost material is preferred. FIG. 7 represents suitable filter material which may be readily made in sheet form from which the leaves 48 and 52 are cut.

Numerals 73 and 75 represent adjacent layers of air-laid fiber felt of filtering quality, for example, a mixture by weight of 20 parts of sulfite wood fibers, 60 parts of long cotton fiber, and 20 parts of synthetic fibers, in particular, a copolymer of vinyl chloride-vinyl acetate, for which a length of 1.5 inches and a denier of 3 is satisfactory, when the felt has a weight in the range from 25 to 50 lbs. per M square ft., and a thickness adjusted to the intended use. Such filtering material is described in copending application Serial No. 186,466, filed April 10, 1962. The fiber felts 73 and 75 have poor tensile strength in air-dry condition and are, therefore, carried by a stronger liner. However, the tensile strength of the felt is increased when wet with perchlorethylene. Each layer has an external facial liner, such as cotton scrim, designated 77 and 79, bonded, respectively, to the felt layers 75 and 73 by a starch binder.

The spacing means 56 may be a simple sheet of cardboard, or a rigid duplex structure of cardboard, such as corrugated paperboard. Channels for flow of liquid may exist within the facial boundaries of the spacer if desired, either by scoring channels into a face or by special structures, some of which are shown in my copending application Serial No. 186,466, filed April 10, 1962. However, a plain sheet of carboard has been found suitable when used with the filter fabric described.

The filter unit described above is axially rigid centrally, and suitably rigid outwardly as a result of said rigidifying spacing means 56. A carrying holder is provided to facilitate handling, shipping and installing. Thus, a filter cartridge is provided.

FIG. 8 represents a precut sheet 72, such as double-faced corrugated paperboard, with corrugations 74 extending in the direction shown to give resistance to compression and to facilitate bending the sheet on dotted crease lines 76, in forming a generally circular housing or holder for the filter unit, as shown in FIGS. 9 and 10. In FIG. 10, the panels having score-lines 76 are shown more arcuate than in reality for drafting convenience. Elongated openings 78 in sheet 72 are formed, there being shown three aligned openings for each of the filter elements. FIGS. 9 and 10 show edge portions 80 of the filter elements projecting from the openings 78 when the sheet 72 is wrapped around the filter unit of FIG. 5 with its side edge portions 72′ and 72″ overlapping and stapled together. To provide for easy access of liquid to the interior of the resulting holder 72$^a$ (FIGS. 8 and 9), holes 82 are also formed in sheet 72.

FIG. 10 is a view looking up at the bottom of the cartridge as shown in FIG. 9, showing the end element 44, and the gasket 70 around the collar 30, for connection in a filter tank.

FIG. 11 illustrates a filter tank 84 with removable cover 86 which when removed permits entry and removal of a filter insert comprising a disposable cartridge represented by dotted lines 88. An inlet pipe 90 is provided for liquid to be filtered, discharging toward baffle plate 90'. Outlet pipe 92 is provided for filtered liquid.

The filter cartridge 88 as described has its two projecting collars 30 with the top gasket 66 and the bottom gasket 70 properly positioned for simple connections within the tank, to seal the axial channel 63 at the top and to discharge from the channel at the bottom.

FIG. 12 is an enlarged fragmentary view partly in cross-section showing the sealing connection at the top. The tank cover 86 has secured to it a spring 94 fitting over a stud 96 and between the cover 86 and a flange 98 around the stud. The stud or shaft 96 extends beyond the flange 98 with its end 96' residing in a hole 99 in a clamping plate 100. Plate 100 is dished as shown from a planar portion 100' which extends (not shown) to lie over the top edge of the cartridge 88 including holder 72 as the latter is shown in FIG. 9. Beneath the hole 99 is an inverted dish or cap 102 with a peripheral flange 104 which fits over gasket 66 enclosing the collar 30. Shaft 96 has a second flange 106 resting on the dished floor of plate 100. Thus, spring 94 forces the whole cartridge downward, and holds the united union sections in tight engagement.

At the bottom of the tank 84 the connection may vary according to the construction of the tank. One form is shown in FIG. 13 in fragmentary cross-section to the left of center line 113. The tank bottom 84' has over and around the entrance to outlet pipe 92 a collar 110 welded in place at 112, with a flat end-face over which sets a gasket 114. A planar plate 116 supports the end 72$^a$ of the cartridge casing 72, and at its center has an opening 118 of which the rim 120 rests on gasket 114. A nozzle 122 projects into the collar 110 and over the rim 120 is a gasket 124 to seal a sealing ring or collar 126 between the gaskets 70 and 124.

Some tank installations have a central perforated stem and the described cartridge is suitable for such tanks. A hollow perforated stem 130, FIGS. 14 and 15 is adapted to be mounted within and to project from the cartridge to close the top opening of channel 63 and to connect its bottom opening to the outlet of the tank. FIG. 14 shows the bottom end of the stem 130 fitted to a nozzle 132 having a sealing O-ring 134, which nozzle fits into a socket 110' similar to that provided by the collar 110 in FIG. 13. Above the nozzle there is a cup-like flange 136, the periphery of which contacts gasket 70 over the lower filter leaf 48. Fixed to the assembly 130–136 is a plate 138 which extends beyond the showing to support the lower end 72$^a$ of casing 72, in the manner indicated in FIG. 13. In use, the cartridge is dropped over the upper end of the stem 130 to the position shown in FIG. 14. This positions the upper end of the stem 130 inside but near the top of the cartridge as shown in FIG. 15.

The upper end of the stem 130 (FIG. 15) carries a threaded end plug 140, into which extends a threaded stem 142, the upper end 144 of which can be positioned to just clear the top 86 of the tank. A T-handle 146 permits easily adjusting the position of stem 142 in the plug 140. An inverted cup 148 fits over the gasket 66 (FIG. 6) and has a central hole 150 through which freely passes the threaded portion of stem 142. A nut member 152 with handle 154 threads on the stem 142 so that it may clamp the cup 148 tightly onto the axial assembly from top to bottom of the stacked unions and filter leaves as shown in FIG. 6. The companion clamping member is the cup-like flange 136 shown in FIG. 14, secured to the lower end of stem 130.

Although I have described the union by reference to sections 10 and 10$^a$ as having preferably a snap-action, it is important to note that the snap-action has no relation to the functioning of the filter. In the filter as installed for use, the sections are alined and compressed in an assembly in which the clamped filter leaves are included. The snap-action is provided for convenience in assembling the leaves to filter elements and the elements to the filter unit, and housing the unit to form the cartridge. With suitably rigid spacing means 56 within each filter element, the described holder 72 maintains the pile intact before installing it in a tank without need for any provision against separation as is provided by the snap-action construction.

Accordingly, the union is subject to modification to eliminate the snap-action construction.

In FIG. 16, there is shown a modified and simplified construction of the union. The channels 19 and 19$^a$ shown in the FIGS. 1 to 3 and 6, are omitted. The receiving section 160 (comparable to second section 10) is an annulus having a flat face 162 with fabric-engaging pimples 164 and an annular axial collar 166 (comparable to collar 20 of section 10). At 45° positions, there are eight recesses 168 into the collar 166, leaving eight tooth-like projections 170. Alternate ones have extending from their flat tops small ribs 172 and the intermediate ones have in their flat faces sockets 174 of size to receive ribs like 172 which are on the companion section of the union. Although FIG. 16 shows omission of the snap-fit of the parts 16 and 32, respectively in FIGS. 2 and 3, and omission of the snap-fits between inwardly flaring recesses 22' (and 22$^a$') and the outwardly flaring teeth 23 (and 23$^a$) it is to be understood in other modifications either one, but not the other of these two snap-fits, may be omitted.

The companion section 160$^a$ has one face exactly duplicating the toothed face of section 160, in which there are like recesses 168$^a$, like projections 170$^a$, like ribs 172$^a$ to fit into sockets 174, and like sockets 174$^a$ to receive ribs 172.

The section 160$^a$ has a flat face 162$^a$ with pimples 164' to oppose pimpled face 162 and to clamp filter leaves between them. Section 160$^a$ has an annular collar 176 extending outwardly from flat face 162$^a$, which collar fits with slight clearance inside the collar 166 of section 160.

Numerous variations of structures are contemplated for the filter leaf, the filter element, the filter unit, the filter cartridge, and by providing accessory means for the filter insert. In use a spent cartridge is removed from a tank as an insert, its accessory parts removed and attached to a fresh cartridge, thus forming a new insert for a tank.

From the foregoing, it will be appreciated that the invention is not limited to or by the illustrative embodiments thereof, and that other forms are contemplated as falling within the scope of the appended claims.

I claim:

1. A coupling union comprising two sections, each having an opening therethrough, a first section having a body portion and a collar surrounding its said opening and extending axially of the opening from said body portion, said second section having its opening of size and shape slidingly to receive said collar, said second section having a body portion to oppose the body portion of said first section when said two sections are in assembled position with said collar slidingly positioned within said opening of the second section, the external faces of the resulting assembly having means to interfit complementarily an external face on an additional one of said sections with at least one of said sections in said assembly at its external face, whereby a pile of such coupling unions may be formed.

2. A coupling union according to claim 1 in which at least one of said sections adjacent its external face has at least one passageway from its said opening through the wall of said opening to the exterior thereof.

3. A coupling union according to claim 1 in which said means to interfit complementarily external faces includes cooperating means for a snap-fit.

4. A coupling union according to claim 1 in which said external faces of the resulting assembly are identical, whereby an identical external face of an additional one of said sections may be interfitted with either one of said sections at its external face in such assembly.

5. A coupling union comprising two sections, each having an opening therethrough, a first section having a body portion with a clamping face and a collar surrounding its said opening and extending axially of the opening from said body portion, said second section having its opening of size and shape slidingly to receive said collar, said second section having a clamping face to oppose said clamping face of said first section when said two sections are in assembled position with said collar slidingly positioned within said opening of the second section, the external faces of the resulting assembly being identical and having means to interfit complementarily an identical external face on an additional one of said sections with either one of said sections at its external face in such assembly.

6. A coupling union according to claim 5 in which at least one of said sections adjacent its external face has at least one passageway from its said opening through the wall of said opening to the exterior thereof.

7. A coupling union according to claim 5 in which said means to interfit complementarily external faces includes cooperating means for a snap-fit.

8. A swiveling coupling union comprising two sections, each having a circular opening therethrough, a first section having a body portion and a cylindrical collar surrounding its said opening and extending axially from said body portion, said second section having its circular opening of diameter slidingly to receive said collar, said second section having a body portion to oppose the body portion of said first section when said two sections are in assembled position with said collar slidingly positioned within said opening of the second section, the external faces of the resulting assembly being identical and having means to interfit complementarily an identical external face of an additional one of said sections with either one of said sections at its external face in such assembly.

9. A swiveling coupling union comprising two sections, each having a circular opening therethrough, a first section having a body portion with a clamping face and a cylindrical collar surrounding its said opening and extending axially from within the periphery of said clamping face, said second section having its circular opening of diameter slidingly to receive said collar, said second section having a clamping face to oppose said clamping face of said first section when said two sections are in assembled position with said collar slidingly positioned within said opening of the second section, the external faces of the resulting assembly being identical and having means to interfit complementarily an identical external face of an additional one of said sections with either one of said sections at its external face in such assembly.

10. A coupling union according to claim 9 in which said means to interfit complementarily external faces includes cooperating means for a snap-fit.

11. A coupling union according to claim 9 in which at least one of said sections adjacent its external face has at least one passageway from its said opening through the wall of said opening to the exterior thereof.

12. A coupling union according to claim 11 in which each of said identical faces has at least one recess inwardly therefrom forming said passageway.

13. A coupling union comprising two sections, each having an opening therethrough, a first section having a body portion and a collar surrounding its said opening and extending axially of the opening from said body portion, said second section having its opening of size and shape slidingly to receive said collar, and cooperating means distributed between said collar and said opening in the second section for effecting a snap-fit on entering said collar in said opening, said second section having a body portion to oppose the body portion of said first section when said two sections are in assembled position with said collar slidingly positioned within said opening of the second section, the external faces of the resulting assembly having means to interfit complementarily an external face on another one of said sections with an external face of such assembly.

14. A coupling union according to claim 13 in which said means to interfit complementarily external faces includes cooperating means for a snap-fit.

15. A coupling union according to claim 13 in which said external faces are identical for a snug pull-apart fit each with another one of said first and second sections.

16. A coupling union having a snap-fit comprising two sections each having a circular opening therethrough, a first section having a base and a cylindrical collar extending outwardly from a said base in the axial direction of its opening, said collar having a beveled first circular lip extending radially outwardly from a location on said collar remote from said base of the collar, said second section having a second circular lip extending inwardly of its circular opening in the radial direction, said second lip having a minimum diameter substantially the same as the diameter of the external cylindrical wall of said collar, said sections being yieldable for a snap-fit to pass the lip of the collar of the first section past the lip in the opening of the second section, the length of the extension of said collar between said first section base and lip being sufficiently great to allow the two sections when coupled to have relative axial movement limited in the direction of separation by the mutual contact of said lips.

17. A coupling union according to claim 16 wherein the second section has a cylindrical wall beyond its said lip in part at least defining the annular opening of said second section, said wall having a diameter substantially the same as the maximum diameter of the lip on said collar.

18. A union according to claim 16 in which said first section has a flat face at right angles to said collar from which said collar extends, and in which said second section has a flat face parallel to the plane of its lip, said flat faces opposing each other in the united sections.

19. A filter element comprising two leaves of filter material joined substantially at their peripheries and inwardly therefrom unsecured to each other so as to form space between them, said leaves having registering openings inwardly of said periphery, a first leaf having within its opening a first coupling section with an opening therethrough, said first section having within said space a radial flange adjacent the first leaf inwardly from the periphery of said leaf opening, and having a collar projecting through said leaf opening and defining the opening through said first section, and said first coupling section having wall means extending from said flange inwardly of the space between said joined leaves and provided with a connecting face for a second coupling section, said second leaf having in contact therewith around its said opening a second coupling section, said second coupling section having an opening therethrough of size snugly to receive a like collar of an additional first coupling section, having a radial flange portion within said space between said leaves and in contact with said second leaf around the opening of said second leaf, and having wall means extending from said flange inwardly of said space and provided with a connecting face for connection with said first coupling section at its said connecting face, said connecting faces being complementary and having complementarily interfitting means to hold said two coupling sections in alinement, said wall means in assembled relation having at least one port therethrough establishing communication from the space between said joined leaves to the openings through said coupling sections, whereby a pile of such elements may be formed by entering a collar of a first coupling section into an opening of a second coupling section, and whereby compression of the assembled sections of such a pile effects the clamping of a first leaf of one element and the second leaf of an adjacent element between a radial flange of a first coupling section and a radial flange of a second coupling section.

20. A filter element according to claim 19 in which the interfitting means of the connecting face of said first section is interfitting with the interfitting means of the identical face on a like first section, and in which the second coupling section duplicates the first coupling section, whereby said filter element may be the end element of a said pile, and said pile has a projecting collar at each end.

21. A union comprising two complementary annular sections of yieldable material for a snap-fit, each having in joined position a body portion presenting a face perpendicular to the axis of the union, said two faces in joined position being separable and movably spaced to function as clamping rings for sheet material between them, a first section having an annular collar extending outwardly at right angles from its said face and around its said opening, said collar having an exterior cylindrical wall of diameter not greater than the minimum diameter of the hereinafter mentioned internal lip of the second section, said collar having a circular integral external lip parallel to and spaced away from said face of the first section, said external lip having a maximum diameter greater than said minimum diameter of said internal lip of the second section, and said external lip being beveled for forced entry through and past said internal lip and into the opening of the second section, said second section having an internal lip extending radially into the circular opening thereof and having beyond said lip and extending away from said face of said second section a cylindrical wall of diameter not less than said maximum diameter of said external lip on said collar, the remaining external faces of the two sections having complementarily interfitting means for a snug pull-apart fit each with another one of said first and second sections.

22. A union according to claim 21 in which said complementarily interfitting means of said external faces are identical for a snug pull-apart fit each with another one of said first and second sections.

23. A union according to claim 21 in which said external faces are identical for a snug pull-apart fit each with another one of said first and second sections, and in which said complementarily interfitting external faces have cooperating means for a snap-fit.

24. A union according to claim 21 in which each one of said external faces is the edge of a cylindrical flange extending in the axial direction of the annular sections.

25. A union according to claim 21 in which each one of said external faces is the edge of a cylindrical flange extending in the axial direction of the annulus, and in which at least one of said cylindrical flanges has at least one opening providing passageway through the flange to the opening of the annular section.

References Cited by the Examiner

UNITED STATES PATENTS

| | | | |
|---|---|---|---|
| 2,471,759 | 5/1949 | Lowrey | 285—330 X |
| 2,515,366 | 7/1950 | Zublin | 285—330 X |
| 3,056,852 | 10/1962 | Sachs. | |
| 3,079,001 | 2/1963 | May | 210—488 X |
| 3,185,507 | 5/1965 | Laurizio | 285—330 X |

REUBEN FRIEDMAN, *Primary Examiner.*

D. M. RIESS, *Assistant Examiner.*